(12) United States Patent
Li

(10) Patent No.: US 7,672,508 B2
(45) Date of Patent: Mar. 2, 2010

(54) IMAGE CLASSIFICATION BASED ON A MIXTURE OF ELLIPTICAL COLOR MODELS

(75) Inventor: Pingshan Li, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 995 days.

(21) Appl. No.: 11/402,349

(22) Filed: Apr. 11, 2006

(65) Prior Publication Data

US 2007/0236712 A1  Oct. 11, 2007

(51) Int. Cl.
  *G06K 9/00* (2006.01)
(52) U.S. Cl. ...................... 382/165; 382/162
(58) Field of Classification Search ................ 382/162, 382/163, 164, 165; 433/215, 26; 435/549, 435/591; 358/1.9, 1.5
See application file for complete search history.

(56) References Cited

U.S. PATENT DOCUMENTS

| | | | | |
|---|---|---|---|---|
| 6,332,036 B1 * | 12/2001 | Sakamoto | ............... | 382/162 |
| 6,400,996 B1 | 6/2002 | Hoffberg et al. | ............... | 700/83 |
| 6,445,818 B1 | 9/2002 | Kim et al. | ............... | 382/165 |
| 6,606,623 B1 | 8/2003 | Hsieh et al. | ............... | 707/5 |
| 6,633,666 B2 * | 10/2003 | Gill et al. | ............... | 382/162 |
| 6,661,907 B2 | 12/2003 | Ho et al. | ............... | 382/118 |
| 6,711,288 B2 | 3/2004 | Kim et al. | ............... | 382/165 |
| 6,732,119 B2 | 5/2004 | Ganapathy et al. | ............... | 707/104 |
| 6,763,148 B1 | 7/2004 | Sternberg et al. | ............... | 382/293 |
| 2003/0009454 A1 | 1/2003 | Kim et al. | ............... | 707/3 |
| 2003/0018631 A1 | 1/2003 | Lipson et al. | ............... | 707/3 |
| 2003/0086627 A1 | 5/2003 | Berriss et al. | ............... | 382/305 |
| 2003/0179911 A1 | 9/2003 | Ho et al. | ............... | 328/118 |
| 2006/0072811 A1 | 4/2006 | Porter et al. | ............... | 382/159 |

OTHER PUBLICATIONS

Jones et al., "Statistical Models with Application to Skin Detection," Cambridge Research Laboratory, Compaq Computer Corporation, pp. 1-23.
Vezhnevets et al., "A Survey of Pixel-Based Skin Color Detection Techniques," Graphics and Media Laboratory, Moscow, Russia.

* cited by examiner

*Primary Examiner*—Anh Hong Do
(74) *Attorney, Agent, or Firm*—Haverstock & Owens LLP

(57) ABSTRACT

A method of classifying images based on elliptical color models is utilized in a number of applications. One or more color models are generated from a set of images with a region of interest. Then, sets of images are utilized for training. One set of images has regions of interest, and the other set of images is without regions of interest. By utilizing the two sets of images, a maximum difference between the sets is achieved, so that a color model is most representative of the object desired. Then using the optimal color model, a collection of images are able to be searched, and images are retrieved based on the probability that the images contain the desired object.

38 Claims, 9 Drawing Sheets

IMAGE CLASSIFICATION BASED ON A MIXTURE OF ELLIPTICAL COLOR MODELS

FIELD OF THE INVENTION

The present invention relates to the field of imaging. More specifically, the present invention relates to improved imaging classification.

BACKGROUND OF THE INVENTION

There are a number of ways of comparing images. Furthermore, there are many different implementations of comparing images. One implementation is to search based on the content of the image rather than a keyword.

A content based image retrieval system is an image retrieval system which classifies, detects and retrieves images from digital libraries, usually databases, by utilizing the content of the image rather than a text label.

Conventional content based image and video retrieval systems utilize images or video frames which have been supplemented with text such as titles, keywords or captions associated with the images. A user retrieves desired images from an image database, for example, by submitting textual queries to the system using these keywords. Images that match the input keywords are retrieved. However, with larger sets of image data, it becomes impractical to store all of the images with text indexes corresponding to each image. It is also highly burdensome for someone to manually attribute specific titles, keywords and captions to each one. Furthermore, text-based searches have their inherent drawbacks as well.

Some content based systems retrieve images using a specified shape or object. For example, to find images of a dog, such systems would be provided with a specification of a shape of a dog. However, since dogs come in a variety of shapes and sizes, this is limited to only finding dogs that match the designated shapes.

SUMMARY OF THE INVENTION

A method of classifying images based on elliptical color models is utilized in a number of applications. One or more color models are generated from a set of images with a region of interest. Then, sets of images are utilized for training. One set of images has regions of interest, and the other set of images is without regions of interest. By utilizing the two sets of images, a maximum difference between the sets is achieved, so that a color model is most representative of the object desired. Then using the optimal color model, a collection of images are able to be searched, and images are retrieved based on the probability that the images contain the desired object.

In one aspect, a method of classifying images comprises generating one or more color models from one or more first images, selecting one or more optimum color models from the one or more color models, wherein the one or more optimum color models are representative of color in the one or more first images and comparing one or more color distributions from one or more second images with the one or more optimum color models. The one or more color models are elliptical. The one or more color models are generated in Hue, Saturation, Value color space. The method further comprises training the one or more color models utilizing one or more third images with one or more regions of interest and one or more fourth images without regions of interest. Training further comprises maximizing the difference between the one or more third images with one or more regions of interest and the one or more fourth images without regions of interest. The method further comprises retrieving the one or more second images based on similarity to the one or more optimum color models. A smaller distance between the one or more optimum color models and the one or more color distributions results in a higher similarity. A keyword is used to select the one or more first images. The one or more first images are selected by a user. The one or more optimum color models and the one or more color distributions are compared over the Internet. Alternatively, the one or more optimum color models and the one or more color distributions are compared on a computing device selected from the group consisting of a personal computer, laptop, digital camera, digital camcorder, handheld, iPod® and home entertainment system.

In another aspect, a method of classifying images comprises generating one or more color models from a first set of images with a region of interest, training the one or more color models utilizing a second set of images with one or more regions of interest and a third set of images without regions of interest, comparing the one or more color models with one or more color distributions from a fourth set of images and retrieving one or more images from the fourth set of images based on the comparison between the one or more color models and the one or more color distributions. The one or more color models are elliptical. The one or more color models are generated in Hue, Saturation, Value color space. Training further comprises maximizing the difference between the second set of images with one or more regions of interest and the third set of images without regions of interest. The smaller the distance between the one or more color models and the one or more color distributions the higher the similarity. A keyword is used to select the first set of images. The first set of images is selected by a user. The one or more color models and the one or more color distributions are compared over the Internet. Alternatively, the one or more color models and the one or more color distributions are compared on a computing device selected from the group consisting of a personal computer, laptop, digital camera, digital camcorder, handheld, iPod® and home entertainment system.

In another aspect, a method of optimizing color models for classifying images comprises generating a color model for each of one or more first images, searching for the color model for maximizing a statistical difference between the one or more first images and one or more second images, updating a color model set by adding the color model for maximizing the statistical difference to the color model set and repeating searching and updating until the statistical difference is maximized. The one or more first images contain one or more regions of interest and the one or more second images are without one or more regions of interest. The color model is elliptical. The color model is generated in Hue, Saturation, Value color space. Optimizing color models is performed on a computing device selected from the group consisting of a personal computer, laptop, digital camera, digital camcorder, handheld, iPod® and home entertainment system.

In yet another aspect, a system for comparing a plurality of images comprises one or more first images, one or more color models generated from the one or more first images, one or more second images with one or more regions of interest for training the one or more color models, one or more third images without regions of interest for training the one or more color models, one or more fourth images, one or more color distributions generated from the one or more fourth images and a program to compare the one or more color models with the one or more color distributions. The one or more color models are elliptical. The one or more color models are generated in Hue, Saturation, Value color space. The one or more fourth images are retrieved based on similarity of the one or more color models to the one or more color distributions. A smaller distance between the one or more color models and the one or more color distributions results in a higher similarity. A keyword is used to select the one or more first images. The one or more first images are selected by a user. The one or more color models and the one or more color distributions are compared over the Internet. Alternatively, the one or more color models and the one or more color distributions are compared on a computing device selected from the group consisting of a personal computer, laptop, digital camera, digital camcorder, handheld, iPod® and home entertainment system.

In another aspect, a capture and display device comprises a receiving unit for receiving image data; a display unit coupled to the receiving unit for displaying image data and a program coupled to the receiving unit and the display unit to compare the image data by generating one or more color models from one or more selected images, selecting one or more optimum color models from the one or more color models, wherein the one or more optimum color models are representative of color in the one or more selected images and comparing one or more color distributions from the image data with the one or more optimum color models. The one or more color models are elliptical. The one or more color models are generated in Hue, Saturation, Value color space. The capture and display device is selected from the group consisting of a personal computer, laptop, digital camera, digital camcorder, handheld, iPod® and home entertainment system.

DETAILED DESCRIPTION OF THE PREFERRED EMBODIMENT

Color is often used as a characteristic of an object or a region for applications such as object detection, image segmentation and content based retrieval. Many color based image classification algorithms have been developed for skin color detection applications. Color based image classification generally uses color modeling such as Gaussian models and Bayes classifiers.

A method of statistical color modeling based on training is described herein. A set of images with a region of interest is used to generate an elliptical color model for each image. Then, two training image sets are used for training the color model. One image set contains images with regions of interest, and the other image set contains images without regions of interest. A set of the optimal color models is chosen from the color model set by maximizing the statistical distance between the two training sets.

Figure 1A:
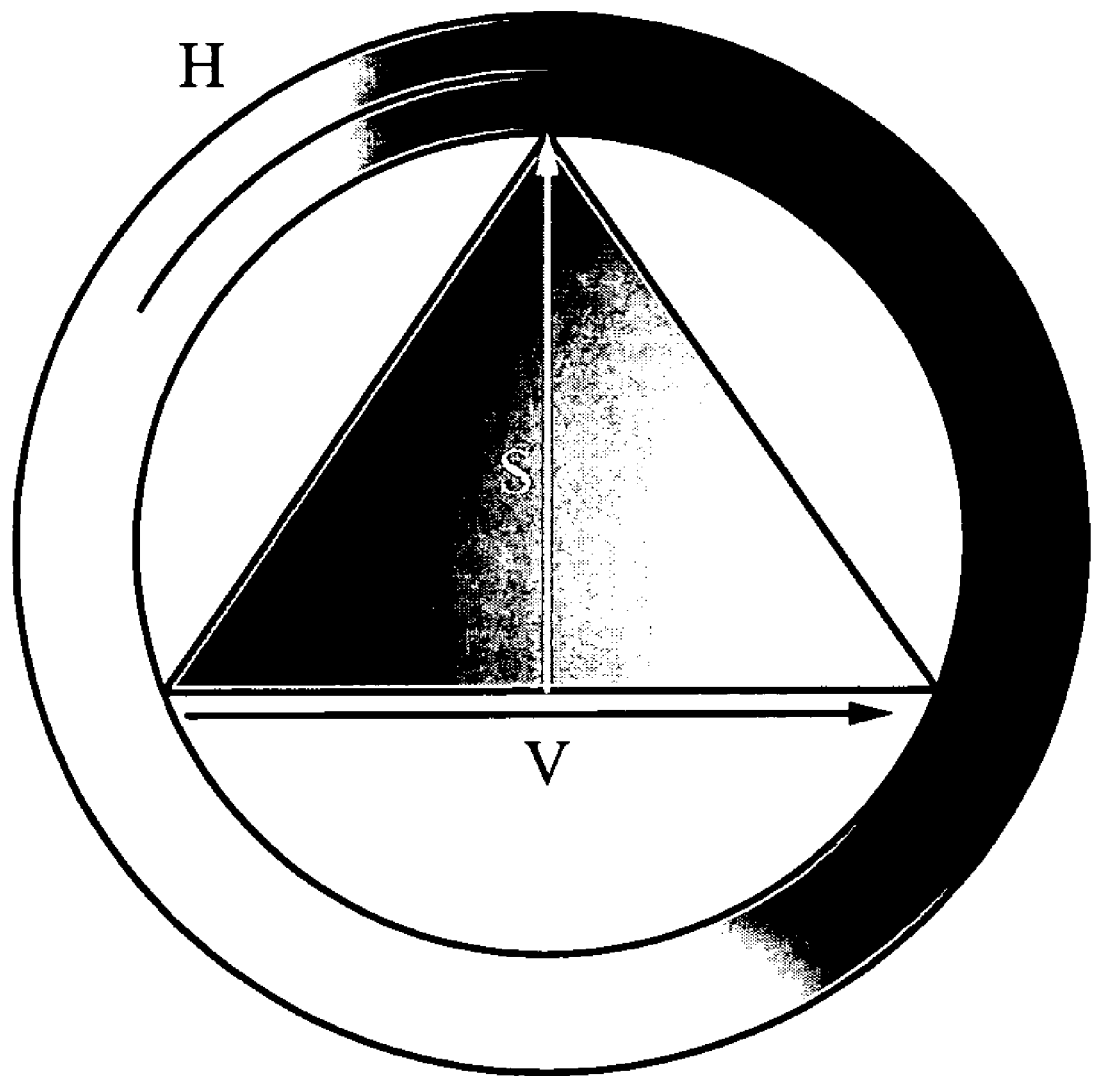
FIGS. 1A-C illustrate different representations of the HSV color space.
Figure 1B:
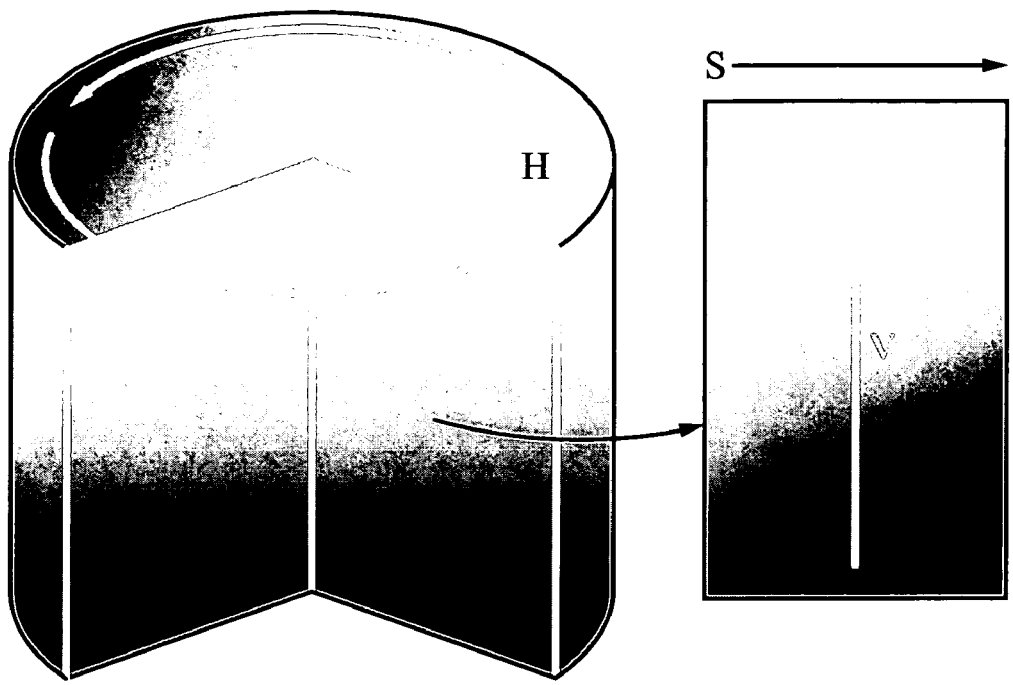
Figure 1C:
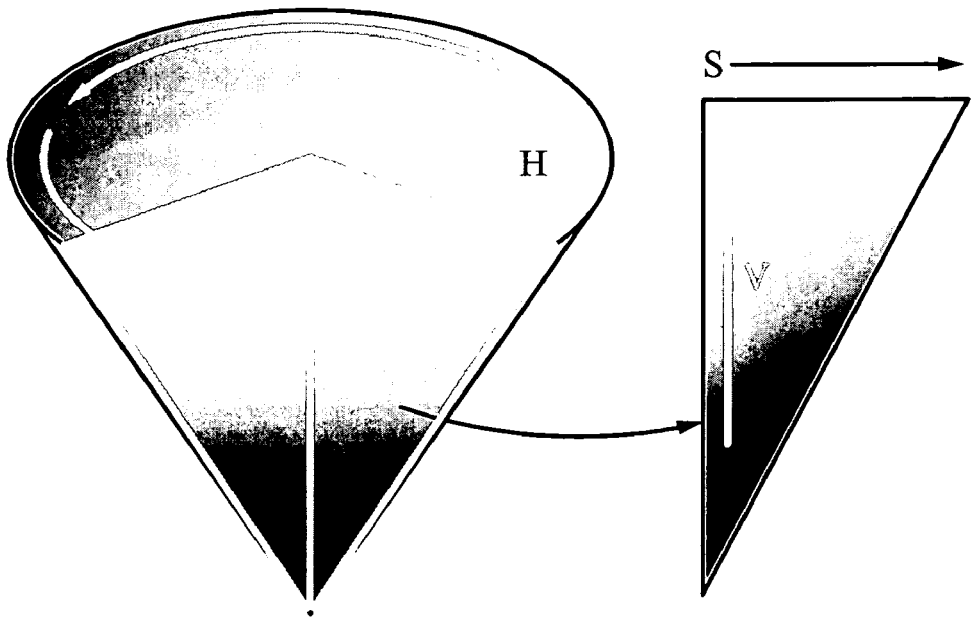

To generate a color model from a given image, the Hue, Saturation, Value (HSV) color space is used. Within the HSV color space, the hue is also the color type (such as red, blue or green). Generally, the hue ranges from 0 to 360 or 0-100%. Saturation is the vibrancy of the color wherein the range is from 0-100%. The lower the saturation of color, the more grayness present, and the color appears more faded. The value is also referred to as the brightness of the color which ranges from 0-100%. FIGS. 1A-C illustrate different representations of the HSV color space. FIG. 1A shows the HSV color space in wheel form. FIG. 1B shows it as a cylinder, and FIG. 1C shows the color space as a cone. For each pixel in the region of interest, the color value is projected on the HS plane in the polar system. To determine the elliptical model, the HS plane is converted to the Cartesian system with coordinates $x=(x_1, x_2)^T$ to compute the mean value and covariance matrix. Assuming the selected color has bivariate normal distribution on the plane with mean value $$\mu = \begin{pmatrix} \mu_1 \\ \mu_2 \end{pmatrix}, \tag{1}$$

and the covariance matrix $$\sum = \begin{pmatrix} \delta_1^2 & \delta_{12} \\ \delta_{12} & \delta_2^2 \end{pmatrix}. \tag{2}$$

The bivariate normal density is constant on ellipses $$(x-\mu)^T \Sigma^{-1}(x-\mu) = c^2 \tag{3}$$

The distribution of the selected color is estimated to be within an ellipse determined by taking c=1.5 in equation (3). The percentage of pixels within the elliptical model in the whole image is used to estimate the total probability that the image has the desired color.

Figure 1D:
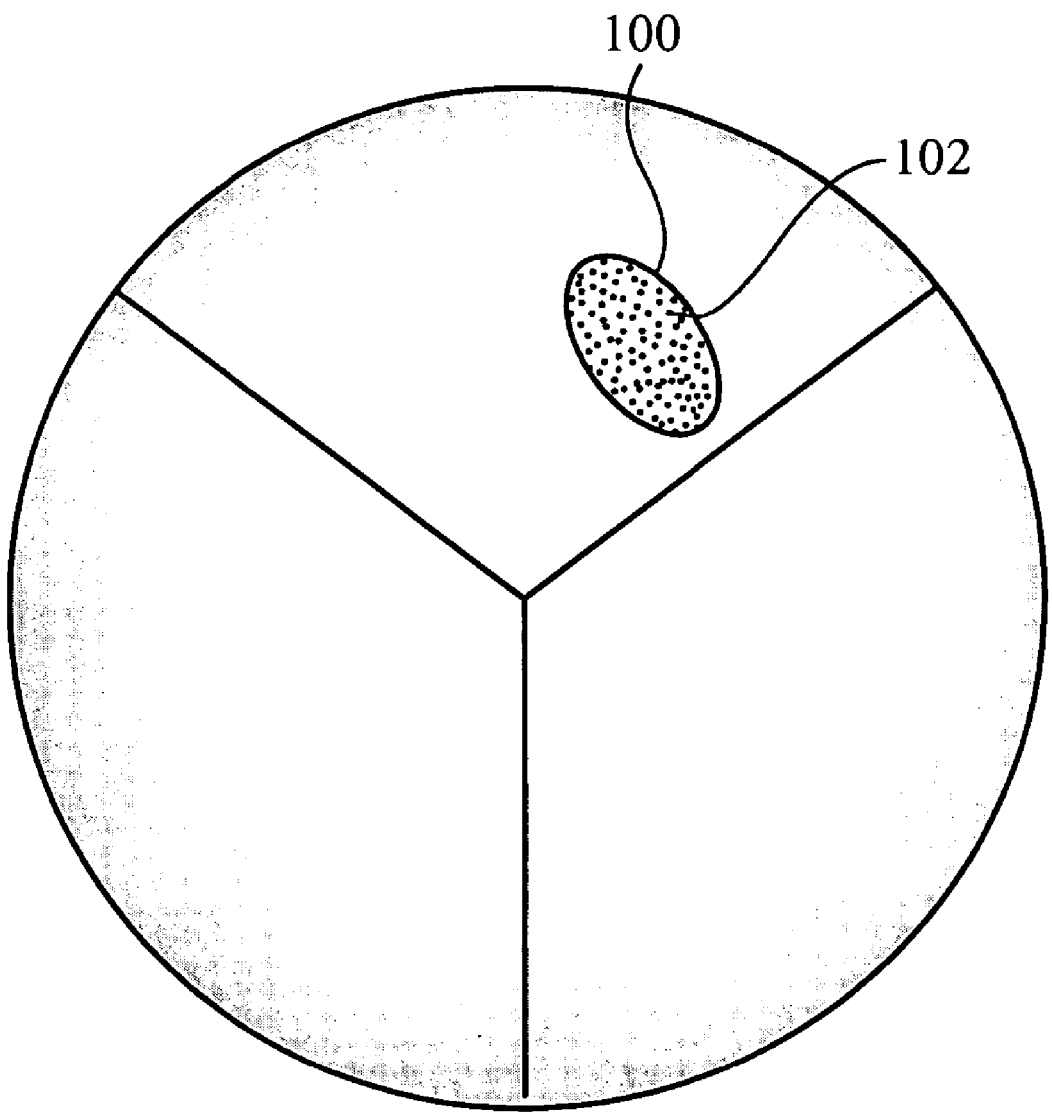
FIG. 1D illustrates an exemplary elliptical color model.

FIG. 1D illustrates an exemplary elliptical color model. Color representations 102 of pixels of an image are mapped on a color space as described above. Then using the equations (1-3), an optimal ellipse 100 is established which is used as the color model for later comparison.

The following equations are utilized to determine how well a given image matches the color model. For a given image I under test, the distance between I and the color model T is defined by $$d(I,T) = \hat{t} - \hat{i} \tag{4}$$

where $\hat{t}$ is the amount of pixels in the color elliptical model and $\hat{i}$ is the amount of pixels of I in the same color model. Both $\hat{t}$ and $\hat{i}$ are represented as the percentage of the pixels in the whole image. A percentage is used instead of an absolute number to allow comparison of different sized images. The distance d(I,T) is able to be negative if there are more pixels in I than in the color elliptical model. If the image contains a large amount of desired color pixels, the distance d(I,T) tends to be small, thus it is determined that this image is a similar image. If the image does not contain many of the desired color pixels, the distance d(I,T) is large and thus it is determined that this image is not a similar image.

Assuming there is a set of multiple color models:

$$T = \{T_1, T_2, \ldots, T_n\} \quad (5)$$

The color matching function between an image I and a color model set T is defined as $$D(I, T) = \sum_{T \in T} d(I, T). \quad (6)$$

The issue is choosing a representative color model set to classify images. The model selection process begins with a set of images with regions of interest $I_a$ and a set of images without regions of interest $I_b$. For a color model set T, suppose $D(I_a, T)$ for $I_a \in I_a$ has mean $\mu_a$ and standard deviation $\sigma_a$; and $D(I_b, T)$ for $I_b \in I_b$ has mean $\mu_b$ and standard deviation $\sigma_b$. The statistical distance between the sets of images $I_a$ and $I_b$ corresponding to the color model set T is defined as $$U(T) = \frac{(\mu_b - \mu_a)^2}{\sigma_b \sigma_a}. \quad (7)$$

The optimization procedure is to find a color model set T that maximizes the statistical distance $U(T)$.

Figure 2:
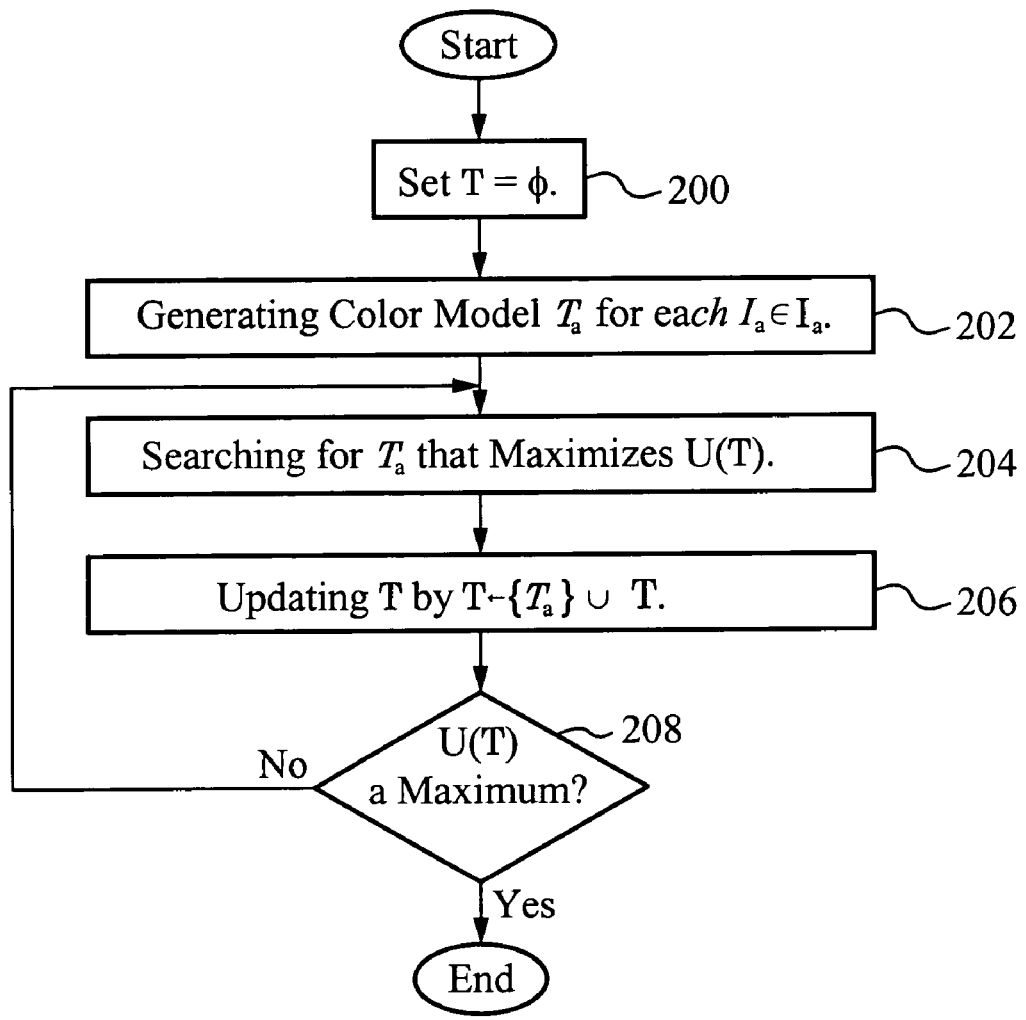
FIG. 2 illustrates a flowchart of the procedure of determining a color model set T that maximizes U(T).

FIG. 2 illustrates a flowchart of the procedure of determining a color model set T that maximizes the statistical distance $U(T)$. In the step 200, the value of set T is set to equal φ. In the step 202, a color model $T_a$ for each $I_a \in I_a$ is generated. In the step 204, a color model $T_a$ is searched for that maximizes the statistical distance $U(T)$: $T_a = \text{argmax } U(\{T_a\} \cup T)$. In the step 206, the set T by $T \leftarrow \{T_a\} \cup T$ is updated. Steps 204 and 206 are repeated until the statistical distance $U(T)$ reaches a maximum. In the step 204, a color model that is already in the set T is able to be chosen again. If this happens, a duplicated color model is added to the set T in the step 206. In the step 208, it is then determined if the statistical distance $U(T)$ has reached a maximum. If it is determined that the statistical distance $U(T)$ has reached a maximum, then the process ends. Otherwise, the process returns to the step 204 to search for a color model that maximizes the statistical distance $U(T)$.

If the sets of images $I_a$ and $I_b$ contain large amounts of images, calculating the statistical distance $U(T)$ becomes time consuming. In such a situation, subsets of the sets of images $I_a$ and $I_b$ are able to be chosen for each iteration. When choosing the subsets for each iteration, the method of choosing the subsets is able to be random or ordered.

After the optimal color model set is obtained, the color matching function of equation (6) is used to evaluate the probability that the image has the object of desired color. The threshold setting for image classification depends on specific applications. The color model matching method works best for the situation where the color in the region of interest has Gaussian or nearly Gaussian distribution, such as skin color, blue sky and green plants.

If the region of interest in an image has multiple colors, such as red flowers plus green leaves, the region is segmented into multiple objects and is classified separately. Then the classification results are combined for the final output. For example, if an image of a rose is desired, the flower part has a distinct color such as red, the stem and leaves have a distinct color such as green and the rest of the image comprises other colors. To properly determine the color model to search for, the image is broken down into different sections. The flower part is cropped, and the stem and leaves are cropped and put into their own separate images. Each section has its own color model using the equations above. Once the two color models for the rose are established, they are able to be compared with other color models to determine similarity between the images. The color models are able to be used for any application that benefits from such information such as a search engine which searches by comparing the color model or color models with images within a database. Preferably, images that match the color models are found and displayed in order of similarity. For example, using the rose example, images that have a high concentration of red and green are displayed first while images lacking in those colors are displayed last or not displayed at all. Furthermore, since red is not the only color utilized, a red car should not appear very high on the list because most likely it will be lacking the green from the stem of the rose. Therefore, the accuracy of the search is improved by utilizing multiple color models for each distinctive aspect of an image. If needed, more color models are able to be used to provide further accuracy, such as a red rose with a green stem with a blue sky. In that scenario, there are three very distinct colors and most likely a sufficient number of pixels of each color. Hence, three color models are able to be implemented.

Figure 3:
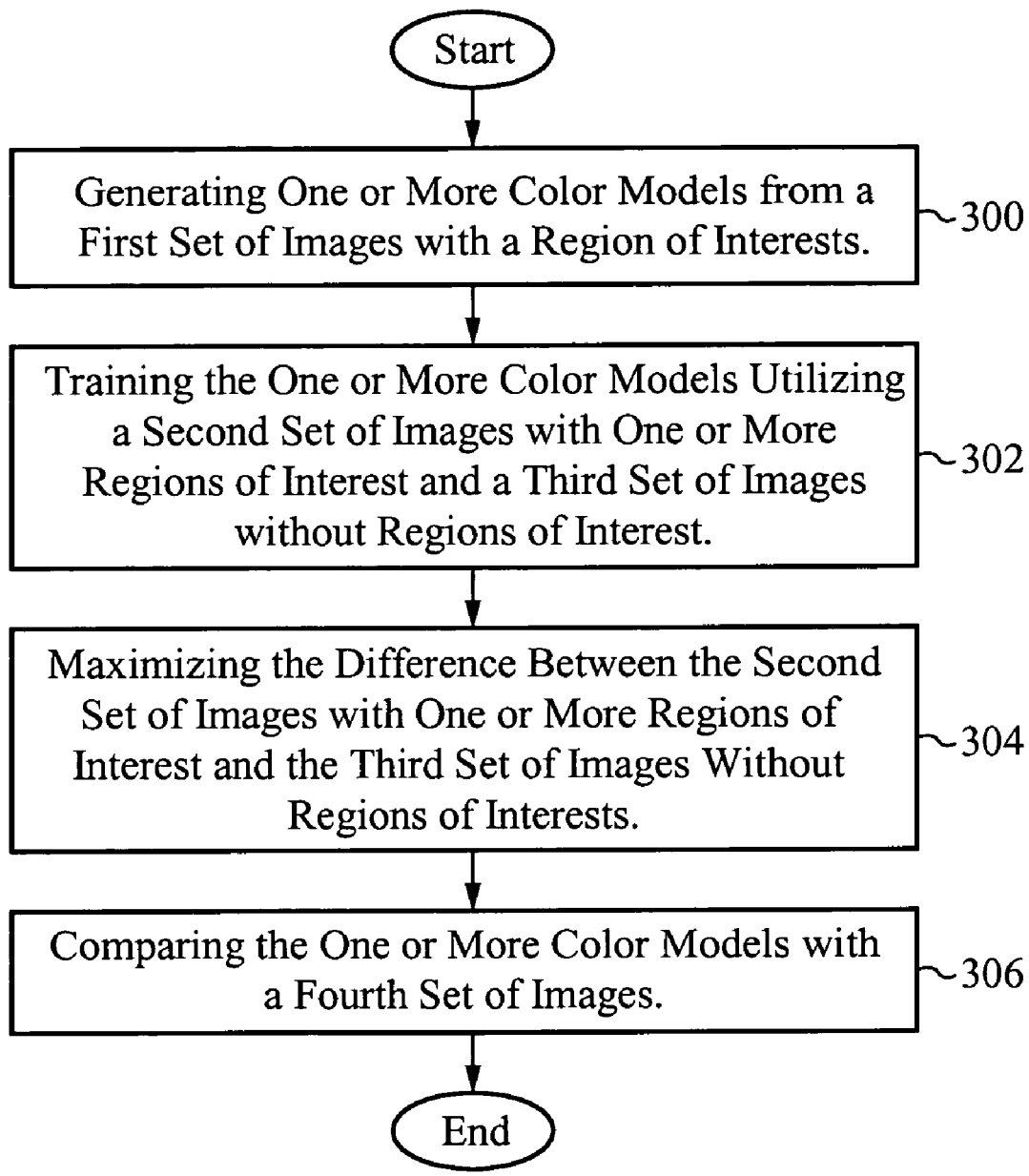
FIG. 3 illustrates a flowchart of the procedure of comparing images.

FIG. 3 illustrates a flowchart of the method described herein. In the step 300, one or more elliptical color models are generated from a first set of images with a region of interest. For example, a set of rose images are provided with the flower part as the region of interest. Color models focused on the flower part are generated from the set of rose images. Then, in the step 302, the one or more color models are trained utilizing a second set of images with one or more regions of interest and a third set of images without regions of interest. In the step 304, the difference between the second set of images with one or more regions of interest and the third set of images without regions of interest is maximized, so that the best one or more color models is selected. Once the best color model is established, the one or more color models are compared with a fourth set of images in the step 306. In some embodiments, one or more images from the fourth set of images are retrieved based on the comparison with the one or more color models.

One of the applications the method described herein is able to be utilized for is Content-Based Image Retrieval (CBIR) also known as Query By Image Content (QBIC) and Content-Based Visual Information Retrieval (CBVIR). CBIR is the application of computer vision to the image retrieval problem of searching for digital images in large databases. "Content-based" means that the search uses the contents of the images themselves, rather than relying on metadata such as titles, captions or keywords. CBIR is needed and useful because of the limitations in metadata-based systems in addition to the increased bandwidth and processing power of the Internet. Textual information about images is easily searched using current technology, but requires those descriptions to be input by someone, which is highly burdensome and impractical when dealing with extremely large amounts of data. Furthermore, keyword searches for text have their own drawbacks such as requiring a user to accurately phrase his search, otherwise the search could result in nothing found.

CBIR systems are implemented in a number of different ways. One example permits a user to make a request, similar to a keyword search, such as "rabbit" and any images of rabbits are retrieved. However, unlike a keyword search where the word "rabbit" is searched for, the search looks for matching colors of an image that has a rabbit. Additionally, color labels are able to be included in the text-input version of the search such as "white rabbit" to further specify which type of rabbit is desired, since rabbits come in a variety of colors. Other systems search by a sample image being provided by the user. As described above, the search begins with a set of sample images provided. The search then retrieves similar images. The results are returned in a variety of ways, and in some embodiments, they are sorted in ascending order based on the closest match. Another method of returning results only returns those images whose similarity falls within a designated acceptable range.

Alternatively, instead of the search being across the Internet, CBIR implementing the method described herein is performed on a local intranet or even on a user's computing device such as a personal computer, laptop, digital camera, digital camcorder, handheld, iPod® and home entertainment system. For example, if a user wants to find all of their baby pictures on the computer, they are able to use the aforementioned technologies and retrieve all pictures that resemble a baby.

Another application the method described here is utilized with is a content recognition system. The content recognition system for indexing occurrences of objects within an audio/video content data stream processes the stream of data to generate a content index database corresponding to the content stream. The content stream is processed by applying recognition technology utilizing the image classification technology described herein to the content within the content stream to identify and index occurrences of identified objects. In an embodiment, the content stream is processed as the content stream is stored within a media storage device. Alternatively, the content stream is processed after the content stream is stored within the media storage device. The objects that are included within the index database, are identified dynamically by the recognition technology during processing. As the content stream is processed, an entry for each object is generated within the index database. In some embodiments, each entry includes an object identifier and corresponding locations of that object. The locations reference where the particular content is stored within the media storage device. Once the content index database is generated, it is able to then be used to quickly locate and navigate to specific occurrences of content and objects within the content stream. The objects that are able to be identified and indexed include any identifiable information within a content stream, including shapes, objects, events and movements within video streams. In some embodiments, the content index database is stored on the same media storage device as the content stream.

Figure 4:
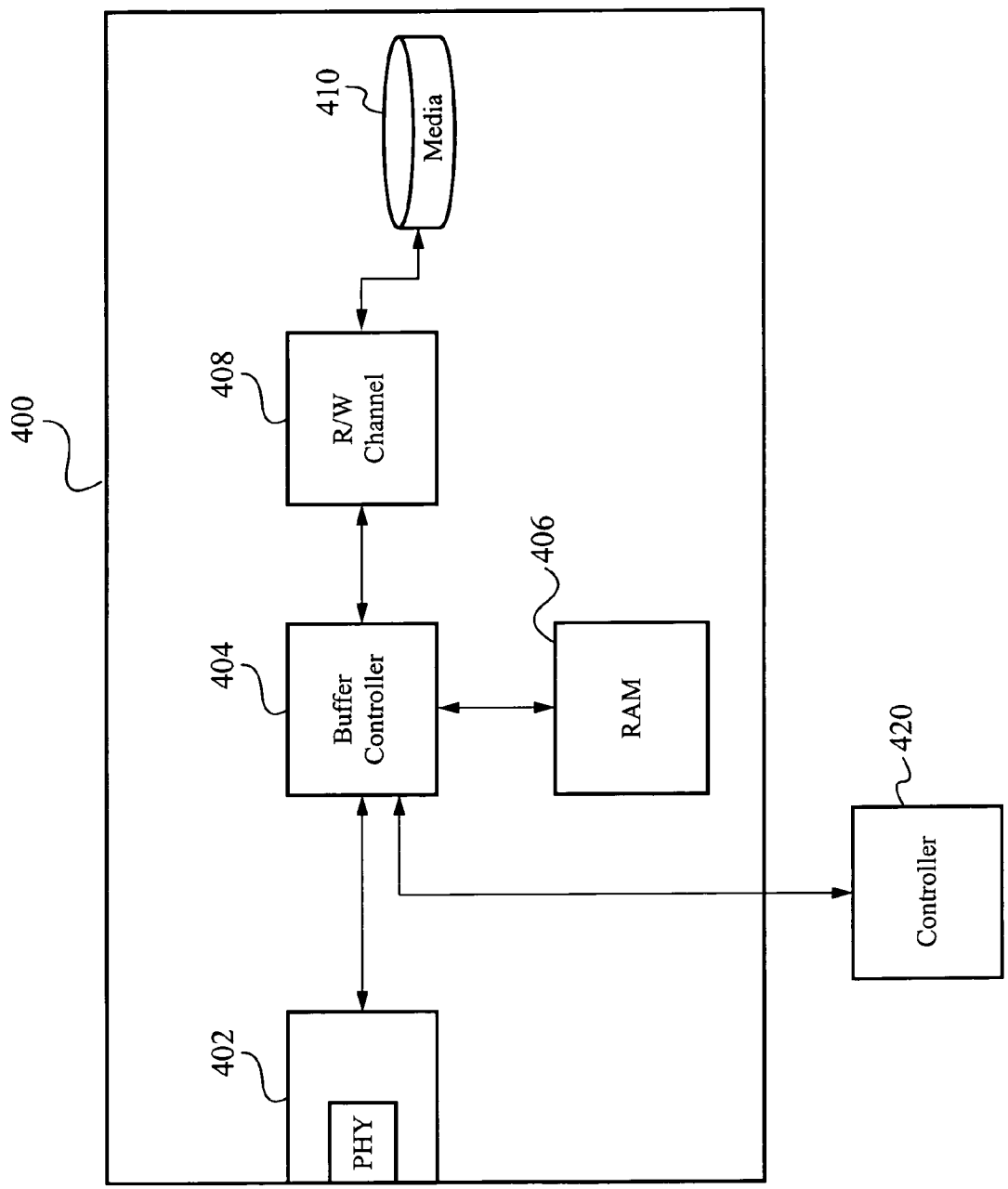
FIG. 4 illustrates a block diagram of a media storage device with external controller operating according to the present invention.

A media storage device with external controller is illustrated in FIG. 4. The media storage device 400 includes an interface circuit 402 for sending communications to and receiving communications from other devices coupled to the media storage device 400. The interface circuit 402 is coupled to a buffer controller 404. The buffer controller 404 is also coupled to a RAM 406 and to a read/write channel circuit 408. The read/write channel circuit 408 is coupled to media 410 on which data is stored within the media storage device 400. The read/write channel circuit 408 controls the storage operations on the media 410, including reading data from the media 410 and writing data to the media 410. An external controller 420 is coupled to the buffer controller 404 for controlling the processing, classifying and indexing of data streams stored on the media 410.

As the stream is processed, the recognition engine within the controller 420 analyzes the content within the content stream to identify the appropriate objects within the content stream. As described above, the appropriate objects are dynamically identified by the recognition engine during processing. As appropriate objects within the content stream are identified, the occurrence of those identified objects within the content stream is then recorded within an index database. Once the content stream is processed and the index database is generated, the user then has the capability to jump to locations within the content stream where the desired object occurs, for viewing or editing the content stream.

Figure 5:
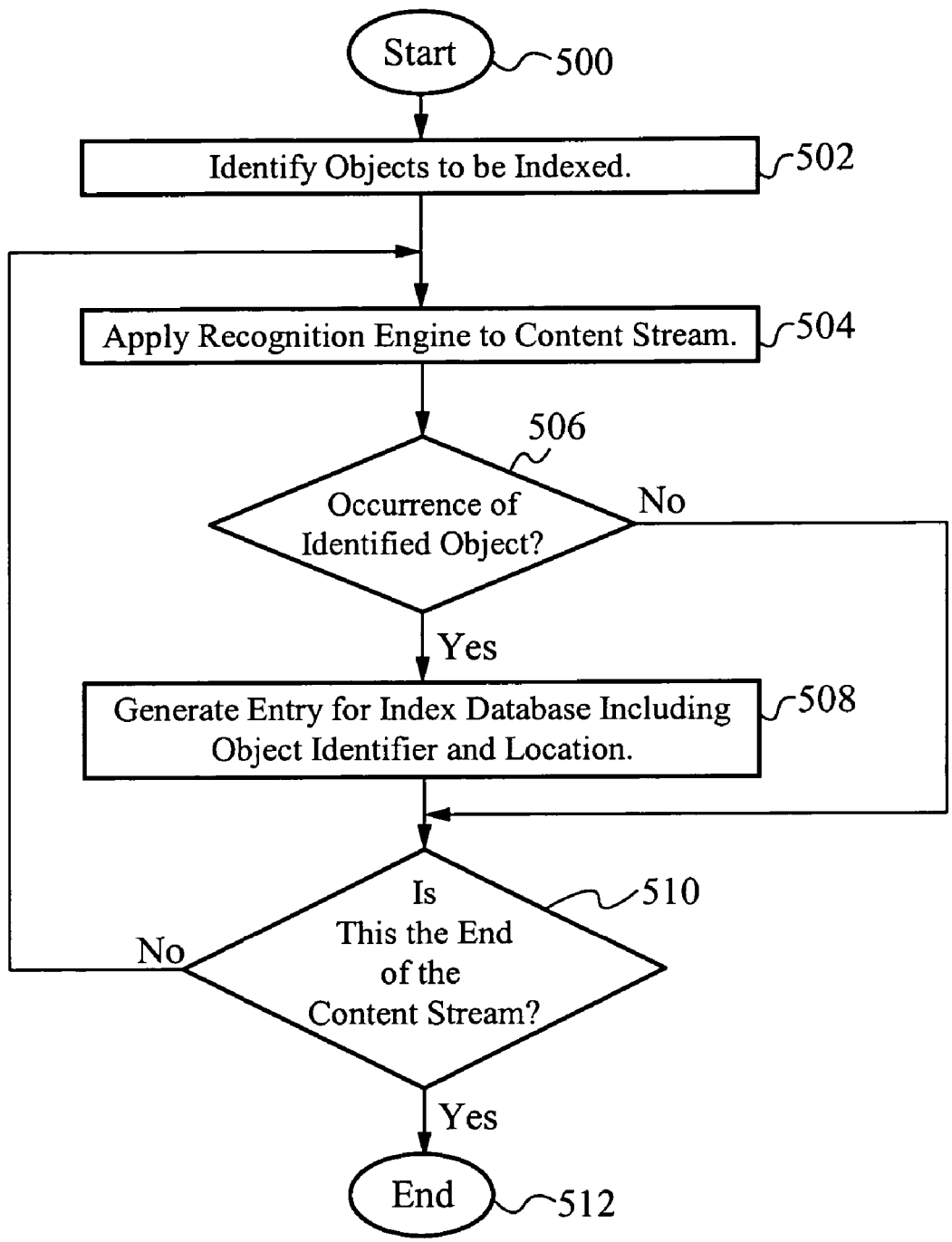
FIG. 5 illustrates a flowchart showing the steps implemented by the controller and the media storage device during processing of a content stream to generate an index database.

A flowchart showing the steps implemented in some embodiments by the controller 420 and the media storage device 400 during processing of a content stream to generate an index database is illustrated in FIG. 5. The process starts at the step 500. At the step 502, the objects to be indexed and included in the index database are identified. As described above, this identification is performed manually by the user or dynamically by the recognition technology during processing. At the step 504, the recognition engine or recognition technology is then applied to the content stream to analyze the content stream and determine the occurrence of identified objects within the content stream.

At the step 506, it is determined whether the content within the content stream that is currently being analyzed includes an identified object. If the content currently being analyzed does include an identified object, then at the step 508, an entry is generated for the index database, including the object identifier entry within the object category and an entry identifying the corresponding location of the content within the location category. After the generation of the entry for the index database at the step 508, or if it is determined at the step 506, that the content currently being analyzed does not include an identified object, it is then determined at the step 510, if there is more content within the content stream, or if this is the end of the content stream. If it is determined that the content stream has not yet been fully processed, then the process jumps back to the step 504, to continue processing the content stream. If it is determined at the step 510 that all of the content stream has been processed, then the process ends at the step 512.

Figure 6:
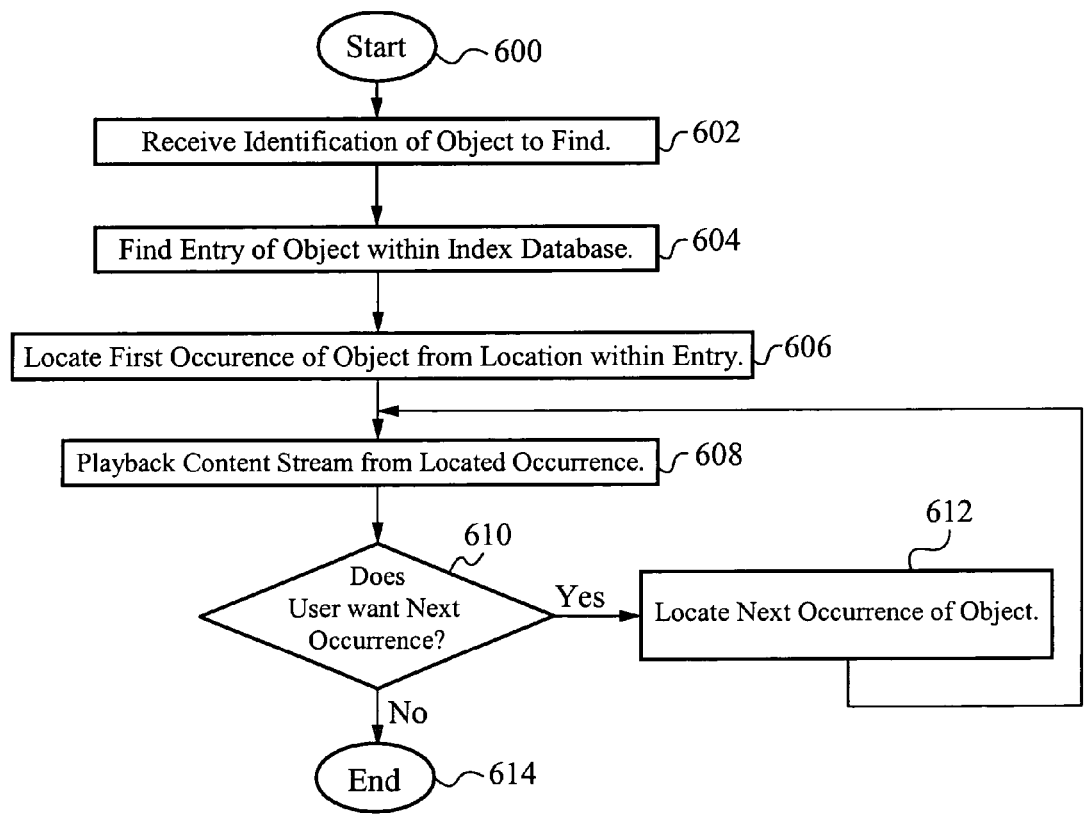
FIG. 6 illustrates a flowchart showing the steps implemented by the controller and the media storage device during playback of a content stream.

A flowchart showing the steps implemented in some embodiments by the controller 420 and the media storage device 400 during playback of a content stream, that has a corresponding index database, is illustrated in FIG. 6. The process starts at the step 600. At the step 602, a user identifies an object that they would like to locate within the content stream. At the step 604, the entry corresponding to the identified object is located within the index database and the location of the first occurrence of the object is targeted, using the entries from the object category and the location category. At the step 606, the first occurrence of the object is located within the content stream. At the step 608, this occurrence of the object is then played back for the user. At the step 610, it is then determined if the user wants the next occurrence of the object located and played back. If the user does want the next occurrence of the object located and played back, then the next occurrence of the object is located at the step 612. The process then jumps to the step 608 to playback this next occurrence. If it is determined at the step 610 that the user does not want the next occurrence of the object located and played back, the process then ends at the step 614.

As an example of the operation of the content recognition system and index database of the present invention, a user records a video of their child's birthday on a tape within a video recorder. This video includes audio and video components. The video is then recorded from the tape to a media storage device 400. Under the control of the controller 420 in conjunction with the media storage device 400, the video is processed to generate the index database by applying recognition technology to the video components to determine each occurrence of an identified object within the content stream. As described above, this processing occurs either as the video is recorded on the media storage device 400, if the user's system has the processing capability to perform the processing online, or after the video is stored on the media storage device 400. During processing the video is analyzed to determine each occurrence of an identified object. As an occurrence of an identified object is found within the video, an entry corresponding to that occurrence is then added to the index database. For example, if the user identifies that they want every occurrence of a birthday cake within the video indexed, the recognition technology is then applied to the video content stream to determine every occurrence of the birthday cake within the video. These occurrences are identified and indexed within the index database, as described above. If the user then wants to view these occurrences or edit the video based on these occurrences, the system will utilize the index database to playback these occurrences of the birthday cake within the video or edit the video based on the occurrences of the birthday cake within the video.

Alternatively, instead of generating an index database, a search system is implemented so that a user is able to request a search for something like a birthday cake, the system searches through the video and the images/video involving a birthday cake are queued to be viewed.

Figure 7:
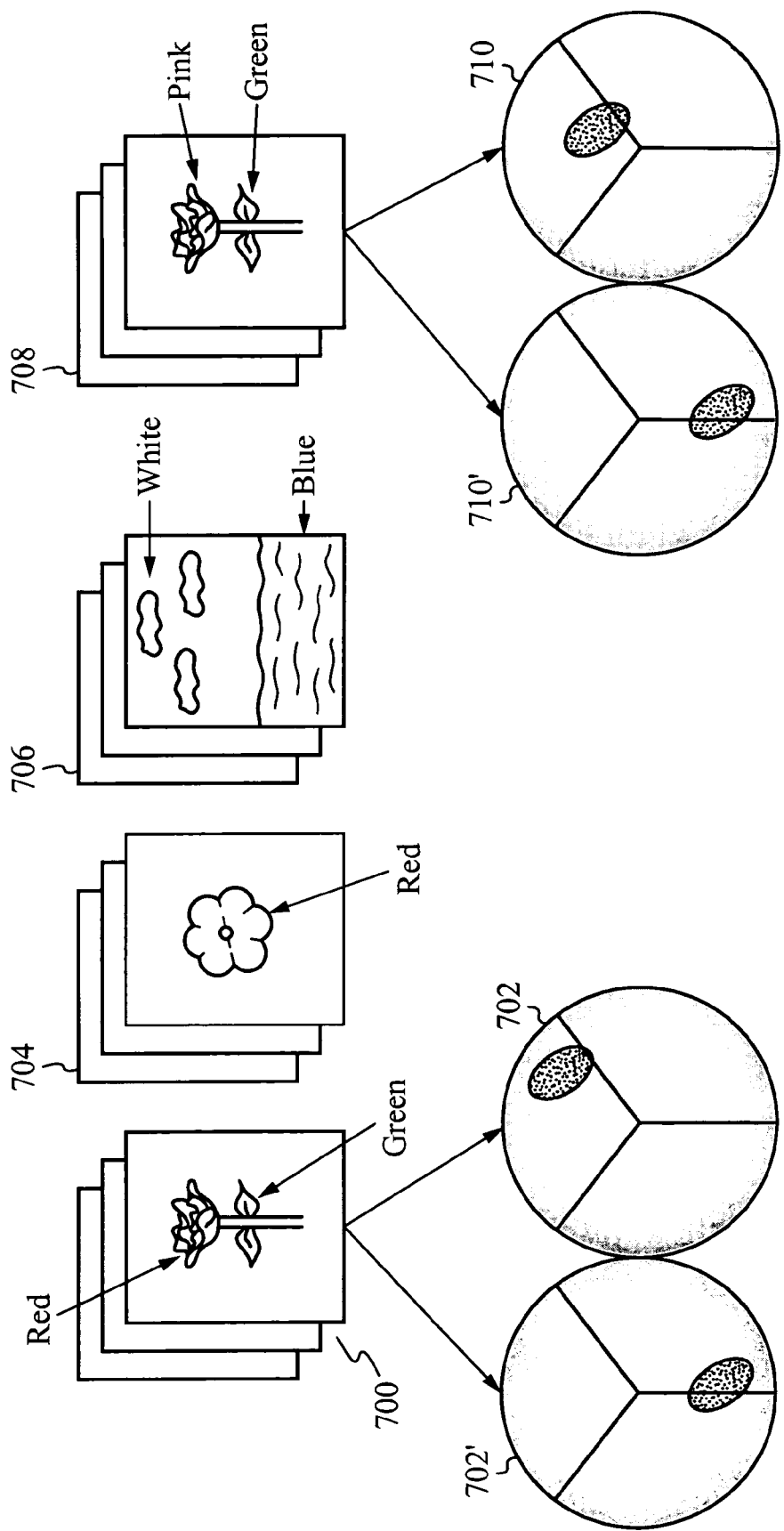
FIG. 7 illustrates an exemplary system implementing the method described herein.

FIG. 7 illustrates an exemplary system implementing the method described herein. One or more first images 700 contain the image that is to be compared. In the example, a red rose with a green stem is the desired image. From the one or more first images 700, one or more elliptical color models 702 and 702' are generated. The color model 702 is from the red rose and the color model 702' is from the green stem of the image 700. One or more second images 704 contain one or more regions of interest for training the one or more color models 702. Here, images with a red flower are used to train the color model 702. Likewise, images with green similar to the flower stem would be used to train the color model 702'. One or more third images 706 do not contain regions of interest such as an image with white clouds and blue water. Such images provide contrast and help train the color models 702 and 702' to select matching images. One or more optimum color models are selected after training. The one or more optimum color models provide the best representation of the one or more first images 700. One or more fourth images 708 are the images to be compared with the one or more first images 700. One or more color distributions 710 and 710' are generated from the one or more fourth images 708. The one or more fourth images are compared based on the similarity of the one or more color distributions 710 and 710' to the one or more color models 702 and 702'. A program is able to compare the images utilizing the color models described above and retrieve similar images.

The method of classifying images based on elliptical color models is utilized in a number of applications. One or more color models are generated from a set of images with a region of interest. Then, sets of images are utilized for training. One set of images has regions of interest, and the other set of images is without regions of interest. By utilizing the two sets of images, with the equations above, a maximum difference between the sets is achieved, so that a color model is most representative of the object desired. Then using the optimal color model, a collection of images is gathered, and images are retrieved based on the probability that the images contain the desired object.

In operation, the image comparison method described herein is able to initially determine a best elliptical color model based on designated images that either have regions of interest or do not. In some embodiments, the HSV color space is utilized. Then using the determined color model, other images are compared, wherein the most similar images are selected, retrieved or utilized in a manner specified. For example, if the method is operating within a image search and retrieval system, then the images that most closely fit with the color model are retrieved in order based on similarity.

Any application that benefits from an improved method of image matching based on color is able to implement the method described herein. In addition to the applications described above, another application includes digital cameras with autofocus such that the autofocus focuses on skin color. Other applications include, but are not limited to, art gallery and museum management, architectural image and design, interior design, remote sensing and management of earth resources, geographic information systems, scientific database management, weather forecasting, retailing, fabric and fashion design, trademark and copyright database management, law enforcement and criminal investigation and picture archiving, communication systems and inspection systems including circuit inspection systems.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of classifying images programmed in memory on a device, comprising:
   a. generating one or more color models from one or more first images;
   b. selecting one or more optimum color models from the one or more color models, wherein the optimum color models are representative of color in the one or more first images; and
   c. comparing one or more color distributions from one or more second images with the one or more optimum color models.

2. The method as claimed in claim 1 wherein the one or more color models are elliptical.

3. The method as claimed in claim 1 wherein the one or more color models are generated in Hue, Saturation, Value color space.

4. The method as claimed in claim 1 further comprising training the one or more color models utilizing one or more third images with one or more regions of interest and one or more fourth images without regions of interest.

5. The method as claimed in claim 4 wherein training further comprises maximizing the difference between the one or more third images with one or more regions of interest and the one or more fourth images without regions of interest.

6. The method as claimed in claim 1 further comprising retrieving the one or more second images based on similarity to the one or more optimum color models.

7. The method as claimed in claim 6 wherein a smaller distance between the one or more optimum color models and the one or more color distributions results in a higher similarity.

8. The method as claimed in claim 1 wherein a keyword is used to select the one or more first images.

9. The method as claimed in claim 1 wherein the one or more first images are selected by a user.

10. The method as claimed in claim 1 wherein the one or more optimum color models and the one or more color distributions are compared over the Internet.

11. The method as claimed in claim 1 wherein the one or more optimum color models and the one or more color distributions are compared on the device selected from the group consisting of a personal computer, laptop, digital camera, digital camcorder, handheld, iPod® and home entertainment system.

12. A method of classifying images programmed in memory on a device, comprising:
   a. generating one or more color models from a first set of images with a region of interest;
   b. training the one or more color models utilizing a second set of images with one or more regions of interest and a third set of images without regions of interest;
   c. comparing the one or more color models with one or more color distributions from a fourth set of images; and
   d. retrieving one or more images from the fourth set of images based on the comparison between the one or more color models and the one or more color distributions.

13. The method as claimed in claim 12 wherein the one or more color models are elliptical.

14. The method as claimed in claim 12 wherein the one or more color models are generated in Hue, Saturation, Value color space.

15. The method as claimed in claim 12 wherein training further comprises maximizing the difference between the second set of images with one or more regions of interest and the third set of images without regions of interest.

16. The method as claimed in claim 12 wherein the smaller the distance between the one or more color models and the one or more color distributions the higher the similarity.

17. The method as claimed in claim 12 wherein a keyword is used to select the first set of images.

18. The method as claimed in claim 12 wherein the first set of images is selected by a user.

19. The method as claimed in claim 12 wherein the one or more color models and the one or more color distributions are compared over the Internet.

20. The method as claimed in claim 12 wherein the one or more color models and the one or more color distributions are compared on the device selected from the group consisting of a personal computer, laptop, digital camera, digital camcorder, handheld, iPod® and home entertainment system.

21. A method of optimizing color models for classifying images programmed in memory on a device, comprising:
   a. generating a color model for each of one or more first images;
   b. searching for the color model for maximizing a statistical distance between the one or more first images and one or more second images;
   c. updating a color model set by adding the color model for maximizing the statistical distance to the color model set; and
   d. repeating searching for the color model and updating a color model until the statistical distance is maximized.

22. The method as claimed in claim 21 wherein the one or more first images contain one or more regions of interest and the one or more second images are without one or more regions of interest.

23. The method as claimed in claim 21 wherein the color model is elliptical.

24. The method as claimed in claim 21 wherein the color model is generated in Hue, Saturation, Value color space.

25. The method as claimed in claim 21 wherein optimizing color models is performed on the device selected from the group consisting of a personal computer, laptop, digital camera, digital camcorder, handheld, iPod® and home entertainment system.

26. A system for comparing a plurality of images, comprising:
   a. one or more first images;
   b. one or more color models generated from the one or more first images;
   c. one or more second images with one or more regions of interest for training the one or more color models;
   d. one or more third images without regions of interest for training the one or more color models;
   e. one or more fourth images;
   f. one or more color distributions generated from the one or more fourth images; and
   g. a program stored in a memory on a device to compare the one or more color models with the one or more color distributions.

27. The system as claimed in claim 26 wherein the one or more color models are elliptical.

28. The system as claimed in claim 26 wherein the one or more color models are generated in Hue, Saturation, Value color space.

29. The system as claimed in claim 26 wherein the one or more fourth images are retrieved based on similarity of the one or more color models to the one or more color distributions.

30. The system as claimed in claim 29 wherein a smaller distance between the one or more color models and the one or more color distributions results in a higher similarity.

31. The system as claimed in claim 26 wherein a keyword is used to select the one or more first images.

32. The system as claimed in claim 26 wherein the one or more first images are selected by a user.

33. The system as claimed in claim 26 wherein the one or more color models and the one or more color distributions are compared over the Internet.

34. The system as claimed in claim 26 wherein the one or more color models and the one or more color distributions are compared on the device selected from the group consisting of a personal computer, laptop, digital camera, digital camcorder, handheld, iPod® and home entertainment system.

35. A capture and display device, comprising:
   a. a receiving unit for receiving image data;
   b. a display unit coupled to the receiving unit for displaying image data; and
   c. a program stored in a memory of the device coupled to the receiving unit and the display unit to compare the image data by
      i. generating one or more color models from one or more selected images;
      ii. selecting one or more optimum color models from the one or more color models, wherein the one or more optimum color models are representative of color in the one or more selected images; and
      iii. comparing one or more color distributions from the image data with the one or more optimum color models.

36. The capture and display device as claimed in claim 35 wherein the one or more color models are elliptical.

37. The capture and display device as claimed in claim 35 wherein the one or more color models are generated in Hue, Saturation, Value color space.

38. The capture and display device as claimed in claim 35 wherein the capture and display device is selected from the group consisting of a personal computer, laptop, digital camera, digital camcorder, handheld, iPod® and home entertainment system.

* * * * *